Nov. 14, 1933.                P. WALTHER                1,935,070
                          INDICATOR INSTRUMENT
                          Filed Aug. 14, 1929
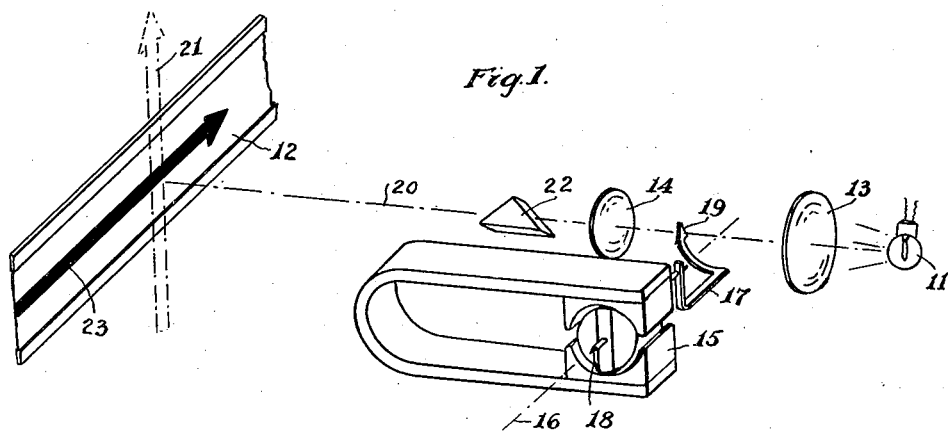
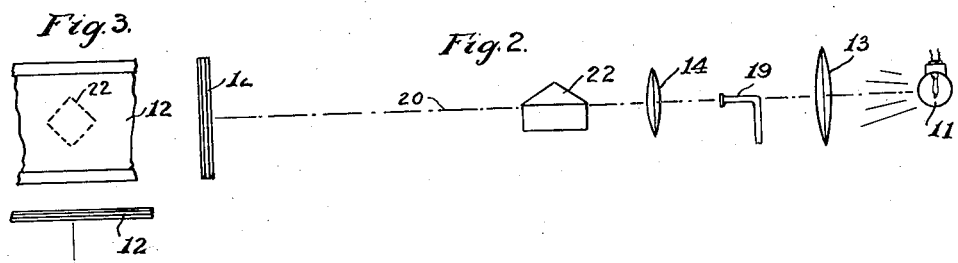
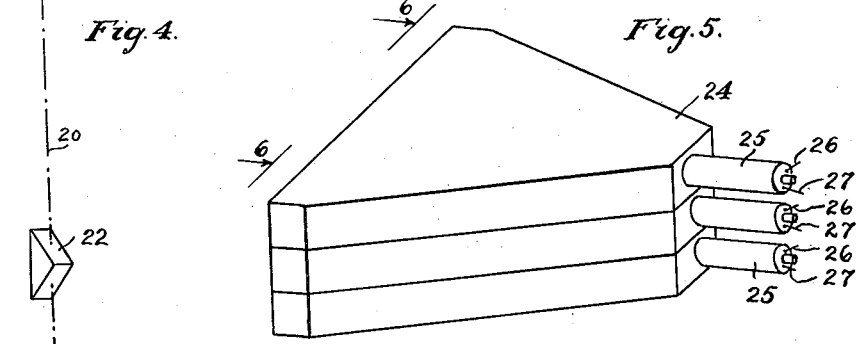
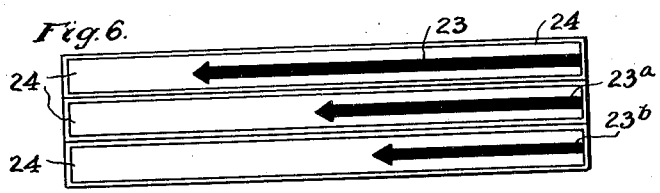
INVENTOR
*Paul Walther*
BY
*Harold D. Penney* ATTORNEY Patented Nov. 14, 1933

1,935,070

UNITED STATES PATENT OFFICE 1,935,070

INDICATOR INSTRUMENT

Paul Walther, Frankfort-on-the-Main, Germany, assignor to Hartmann & Braun Aktiengesellschaft, Frankfort-on-the-Main, Germany, a corporation of Germany Application August 14, 1929, Serial No. 385,735, and in Germany September 20, 1928

4 Claims. (Cl. 88—24)

This invention relates to measuring devices having instrument indicators projected onto a scale and employed for the purpose of projecting the position of the movable part of a measuring mechanism in the form of a shadow-arrow of variable length onto a brightly illuminated pane of glass, and it consists in the novel features, which are hereinafter described.

The present day arrangement of such a device has the disadvantage that its vertical constructive height is very considerable. Hence, if several such devices are assembled into a group or pile, there must be extra space left between the light chambers of the individual devices, for placing therein the measuring devices, which in present day practice have thereon vertical axes and horizontally disposed offset indicators.

One of the objects of this invention is to create an apparatus of the above character which requires a lesser constructive height.

Another object of my invention is to provide an instrument of the above character that will insure the highest number of indications on as small a surface as possible in control rooms of large power distribution plants, thereby facilitating the measuring of power by means of the indicating principle.

A further object of my invention is the solution of the above space problem by means of the use of the so called optical upright image projection.

A still other object of my invention is to produce a perfected measuring apparatus with instrument indicator projected onto a scale, which in addition to having the above advantages is also simple, effective, durable and inexpensive.

I attain these objects by the apparatus, one form of which is illustrated in the accompanying drawing or by any mechanical equivalent and obvious modification of the same.

In the drawing,

Fig. 1 is an illustration in perspective of my improved measuring apparatus with the instrument indicator projected onto a scale, showing the parts of the projecting apparatus as not enclosed.

Fig. 2 is a side elevation of the parts of the projecting apparatus used in connection with my measuring-instrument, showing also the illuminated pane or scale in edge view and the prism, which is hereinafter described.

Fig. 3 is a front view of the said pane; and

Fig. 4 is a plan view, showing the position of said prism with relation to said pane.

Fig. 5 is a perspective view of multiple light chambers of my measuring apparatus, enclosing therein also the chambers containing the measuring devices, which are hereinafter described.

Fig. 6 is a view of said light chambers as shown in Fig. 5 in the direction of the arrows, showing the illuminated panes with the projected arrows thereon.

Like numerals refer to like parts throughout the several views.

11 designates a source of light, which illuminates a scale or pane 12 through a pair of lenses 13 and 14.

A measuring mechanism or instrument 15 is placed with its axis 16 in a horizontal position as shown.

An indicator 17 is secured to a revolvable spindle 18 of the armature of a motor, as shown in Fig. 1, said indicator terminating in an arrow 19, the head of which is vertically positioned relative to the axis 16, as also shown in the said figure. This indicator is placed in the path of the rays or beam of light 20.

The shadow of the arrow 19 ordinarily would be the silhouette 21, shown in dotted lines in Fig. 1; to turn this silhouette or shadow into a horizontal position I employ a prism 22, which is inclined at an angle of 45° to the plane formed by the centre line of the scale 12 and the center line 20 of the rays of light. A prism placed at an angle of 45° has the peculiar property of turning an image through an angle of 90°; the arrow 19 will, therefore, be represented on said scale or receiver 12 by the black silhouette 23.

By placing the measuring mechanism or utensil 15 with its axis 16 horizontal the entire outfit has its height reduced considerably as compared with the same outfit having its axis 16 vertical, and the measuring mechanism 15 may even be enclosed in the light chamber 24, which normally encloses also said lenses 13 and 14, prism 22 and scale 12.

Multiple light chambers 24 are shown in Fig. 5 each having thereon a tube 25 enclosing said source of light 11, which may be an electric bulb; and each of said tubes 25 has thereon wires 26 and 27 for connecting the same to a source of electricity for said bulb 11.

Several such devices or outfits each enclosed in a chamber 24 may be combined to form a group as shown in Fig. 5, in which the light chambers are disposed one directly above the other and require very little total construction height as compared with the arrangement in which the axes of said measuring utensils 15 are vertical, in which case a chamber enclosing each of said utensils would have to be interposed between every adjacent pair of light chambers 24, thereby increasing the total construction height of said group of outfits.

As seen from the direction of the arrows see in Figs. 5 and 6 the panes 24 with the silhouettes 23, 23ª, 23ᵇ thereon will appear one closely above the other, thereby facilitating the comparing of the lengths of the individual shadow pictures with one another; and the entire apparatus or outfit will have the advantage of being read more easily than with the outfits heretofore used.

Many changes may be made in the details of my measuring apparatus with instrument indicator projected on to a scale without departing from the main scope of my invention, and parts of my invention may be used without other parts.

I do not, therefore, restrict myself to the details as shown and described; but I intend to include also all mechanical equivalents and obvious modifications of the same within the scope of my invention.

I claim as my invention and desire to secure by Letters Patent:

1. In combination, superposed wide flat chambers respectively having a horizontally elongated screen disposed in one vertical plane; a light source opposite each screen; a measuring instrument in each chamber having a spindle substantially parallel to the longer axis of the screen; an index member mounted on the end of said spindle including an elongated arrow arranged for movement approximately upright in an upright plane passing through said source substantially perpendicularly to the screen; and means for projecting upon the screen a horizontal shadow of said arrow; said means, arrow and spindle cooperating to produce the new functions of allowing the spindle to be parallel to the long axis of screen while permitting the arrow to move in the vertical plane perpendicular to the screen, resulting in the further new function of permitting the over-all length of the spindle and indicator to be about twice as great as the interior height of the chamber, permitting an efficient instrument to be used while permitting the chambers to be placed flat upon each other to save space, weight and cost.

2. In combination, a wide flat light chamber having a relatively small height and provided with a horizontally elongated vertical wall forming a screen; a light source opposite the screen; a measuring instrument in the chamber to one side of a line passing perpendicularly from the middle of the screen through said source line and having a spindle substantially parallel to the main axis of the screen; an index member mounted on the end of said spindle including an elongated arrow arranged for movement approximately vertically in a plane passing through said line substantially perpendicularly to the screen and the horizontal plane of the chamber; and reversing means between the arrow and screen for projecting upon said screen an enlarged horizontal image of said arrow; said means, arrow and spindle cooperating to produce the new function of allowing the over-all length of said instrument, including the indicator, in the direction of the axis of the spindle to be greater than the interior height of the chamber.

3. In combination, a plurality of superposed wide flat light chambers superposed flat one upon the other, each having a relatively small height and provided with a horizontally elongated vertical wall forming a screen; a light source at the side of the chamber opposite the screen; a lens between the source and screen disposed substantially coaxially in a line passing perpendicularly from the middle of the screen through said source; a measuring instrument in the chamber to one side of said line and having a spindle substantially parallel to the main axis of the screen about midway between the top and bottom of the chamber; an index member mounted on the end of said spindle and including an elongated arrow arranged substantially circumferentially of the axis of said spindle and movable approximately vertically in a plane passing through said line substantially perpendicularly to the screen and horizontal plane of the chamber and offset a considerable distance from said spindle; and a reversing prism between the lens and screen at an angle of 45° to said horizontal plane, and cooperating with the lens to project upon said screen an enlarged horizontal image of said arrow.

4. In combination, superposed wide flat chambers respectively having a horizontally elongated screen disposed in one vertical plane; a light source opposite each screen; a measuring instrument in each chamber having a spindle substantially parallel to the longer axis of the screen; an index member mounted on the end of said spindle including an elongated arrow arranged for movement approximately upright in an upright plane passing through said source substantially perpendicularly to the screen; and means for projecting upon the screen a horizontal shadow of said arrow.

PAUL WALTHER.